United States Patent [19]

Day et al.

[11] 4,418,442

[45] Dec. 6, 1983

[54] FLUID STRIPPING APPARATUS INCLUDING A STRAP FOR INTERCONNECTING ADJACENT AIRBAGS

[76] Inventors: David R. Day, 4334 Ocean Dr., Apt. 203, Corpus Christi, Tex. 78012; Lucian G. McElroy, 3315 Brocker Rd., Metamora, Mich. 48455

[21] Appl. No.: 378,956

[22] Filed: May 17, 1982

[51] Int. Cl.³ .............................................. B60S 3/04
[52] U.S. Cl. ............................... 15/312 A; 15/316 R
[58] Field of Search .............. 15/312 A, 316 R, 312 R

[56] References Cited

U.S. PATENT DOCUMENTS 3,600,224  8/1971  Stilwell ........................ 15/312 A X
4,161,801  7/1979  McElroy et al. ................ 15/316 R Primary Examiner—Chris K. Moore
Attorney, Agent, or Firm—Harold W. Milton, Jr.

[57] ABSTRACT

An apparatus (10) for stripping fluids from the surface of a vehicle includes an air distributor (28) and inflatable bags (14–26), each of generally rectangular transverse cross section. The bags (14–26) are supported by the air distributor (28) and each of the bags (14–26) includes an inlet end (40) connected to the air distributor (28) for introducing air under pressure into the bags (14–26) and a nozzle end (42) of smaller area than the inlet end (40) spaced apart from the inlet end (40) for emitting a stream of air while maintaining the bags (14–26) in a nonflailing orientation and substantially rigidly inflated. The invention is characterized by a connector strap (44) having one end portion (46) secured to a first of the bags (14, 18) and a second end portion (48) secured to a second of the bags (16, 20) and spaced along the bags (14–20) from the air distributor (28) for connecting the first bag (14–18) to the second bag (16–20) for properly positioning the second bag (16–20) in relation to a vehicle body when the first bag (14, 18) is deflected by the engaging vehicle (34).

11 Claims, 2 Drawing Figures

FLUID STRIPPING APPARATUS INCLUDING A STRAP FOR INTERCONNECTING ADJACENT AIRBAGS

TECHNICAL FIELD

This invention relates to a fluid stripping apparatus for stripping fluid from an object. More specifically, the instant invention provides a means for properly positioning a second fluid stripping bag in relation to a vehicle body when a first fluid stripping bag is deflected by the engaging vehicle.

BACKGROUND ART

The U.S. Pat. No. 4,161,801 to Day et al discloses an apparatus for stripping fluids from the surface of a vehicle, the apparatus including a plurality of generally rectangular in cross section, flexible and inflatable fluid stripping bags. The invention has found great success in the carwash industry, since it combines an effective means of drying vehicles with an efficient use of energy. The apparatus generally includes a plurality of bags hanging vertically from an air distributor system and a plurality of bags extending laterally therefrom. More specifically, a first laterally extending bag is disposed above and downstream the path from a second laterally extending bag. Bags of this configuration are generally disposed on each side of the path of the passing vehicle. The second bag initially engages the front of the vehicle and is deflected by the passing vehicle to engage the side of the vehicle. The first bag is positioned to engage the windshield and side windows. A problem arises when the passing vehicle is of a height such that the first bag engages the hood of the passing vehicle prior to engaging the windshield. In such a condition, the corner of the nozzle of the bag undesirably engages the top of the front hood of the vehicle. The prior art does not teach a means for properly positioning the upper bag to prevent such a condition.

STATEMENT OF INVENTION

According to the present invention, an apparatus for stripping fluids from the surface of a vehicle includes an air distributor and a plurality of inflatable bags, each of generally rectangular transverve cross section. The bags are supported by the air distributor. Each of the bags include an inlet end connected to the air distributor for introducing air under pressure into each of the bags and a nozzle end of smaller area than the inlet end spaced apart from the inlet end for admitting a stream of air while maintaining the bags in a nonflailing and inflated orientation. The invention is characterized by connector means having one end portion secured to a first of the bags and a second end portion secured to a second of the bags and spaced along the bags from the air distributor for connecting the first bag to the second bag for properly positioning the second bag in relation to a vehicle body when the first bag is deflected by the engaging vehicle.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of an apparatus for stripping fluids from the surface of a vehicle constructed in accordance with the instant invention; and FIG. 2 is an elevational front view of the instant invention engaging a vehicle passing therethrough.

DETAILED DESCRIPTION OF THE DRAWINGS

Figure 1:
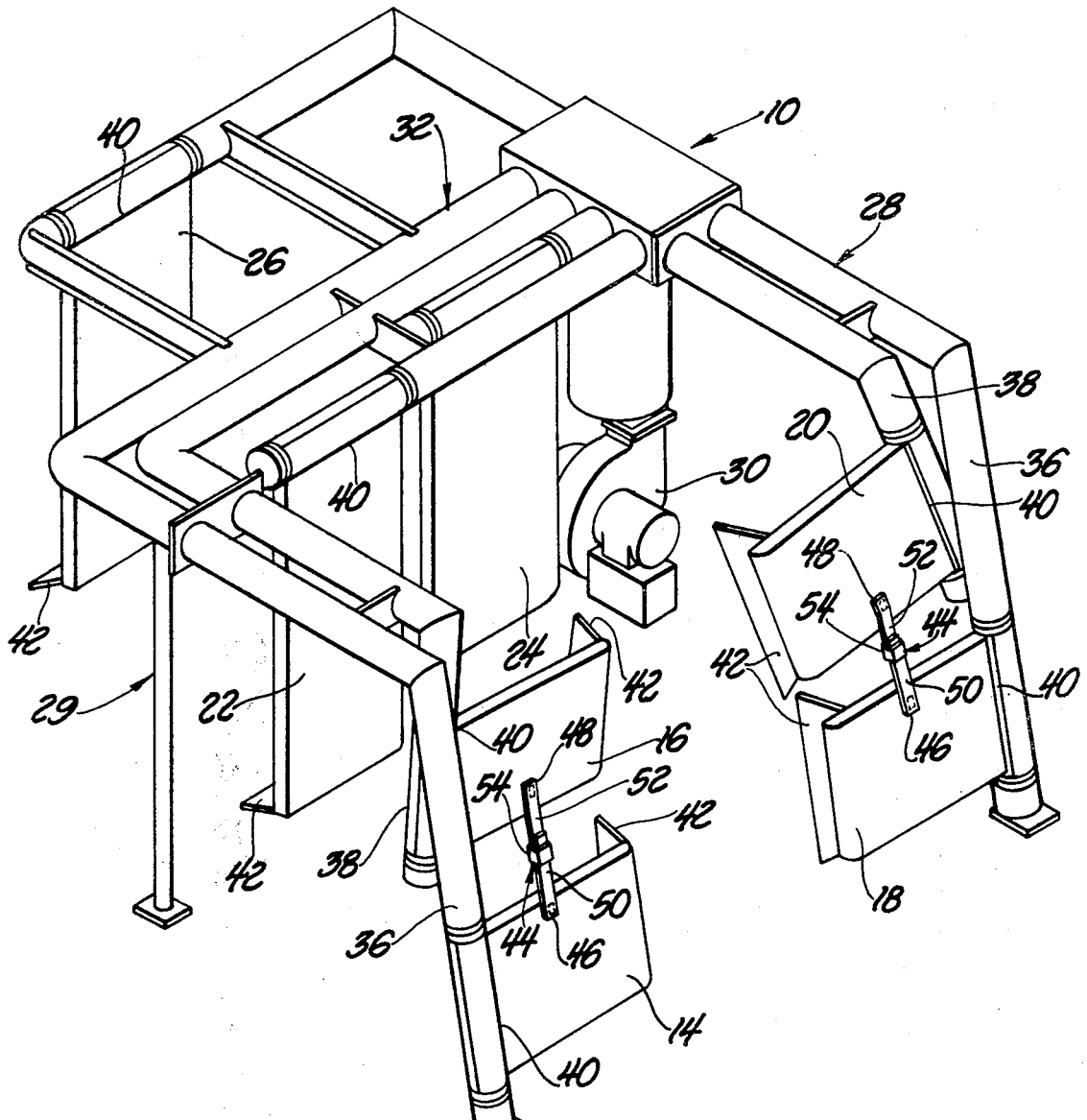

Referring to the drawings, an apparatus for stripping fluid from the surface of a vehicle constructed in accordance with the instant invention is generally shown at 10. While the instant invention has broader application in that it can be used to strip fluids from the surface of a variety of objects, it is described herein with reference to a carwash system, since it is particularly applicable to such systems.

The invention generally comprises a plurality in inflatable bags 14 through 26 supported by an air distributor, generally indicated at 28. The air distributor 28 includes fan means 30 for distributing air through an overhead duct, generally indicated at 32, which may be supported by the ceiling super structure of the building which houses the carwash system. Attached to the underside of the overhead duct 32 are three of the bags 22, 24 and 26 which hang downwardly into the path of the vehicle, generally indicated at 34 in FIG. 2. The air distributor system 28 includes a pair of first and second side ducts 36 and 38. The side ducts 36 support a first of the laterally extending bags 14 and 18 and ducts 38 support a second of the laterally extending bags 16 and 20, the second bags 16 and 20 being disposed above the first bags 14 and 18 and upstream in the path of the vehicle 34.

The ducts 36 are slightly angled with respect to the vertical and the ducts 38 are angled to a greater degree than the ducts 36. The significance of this positioning of the ducts 36 and 38 will be discussed in greater detail below.

The inflatable bags 14 through 26 each are of generrally rectangular transverse cross section and are supported by the air distributor 28 in an array along the path of the vehicle 34 to strip fluid from the vehicle 34. Each of the bags 14–26 include an inlet end 40 connected to the air distributor 28 for introducing air under pressure into the bags 14–26. The bags 14–26 further include a nozzle end 42 of smaller cross-sectional area than the inlet end 40 spaced apart from the inlet end 40 for emitting a stream of air while maintaining the bags 14–26 in a nonflailing orientation and substantially rigidly inflated. This phenomena and a more specific description of the bags are provided in the United States patent application 4,161,801 to Day. A more detailed description of the means for connecting the bags to the air distributor system are provided in the co-pending patent application entitled "Fluid Stripping Apparatus Having Adjustable Hinge".

Figure 2:
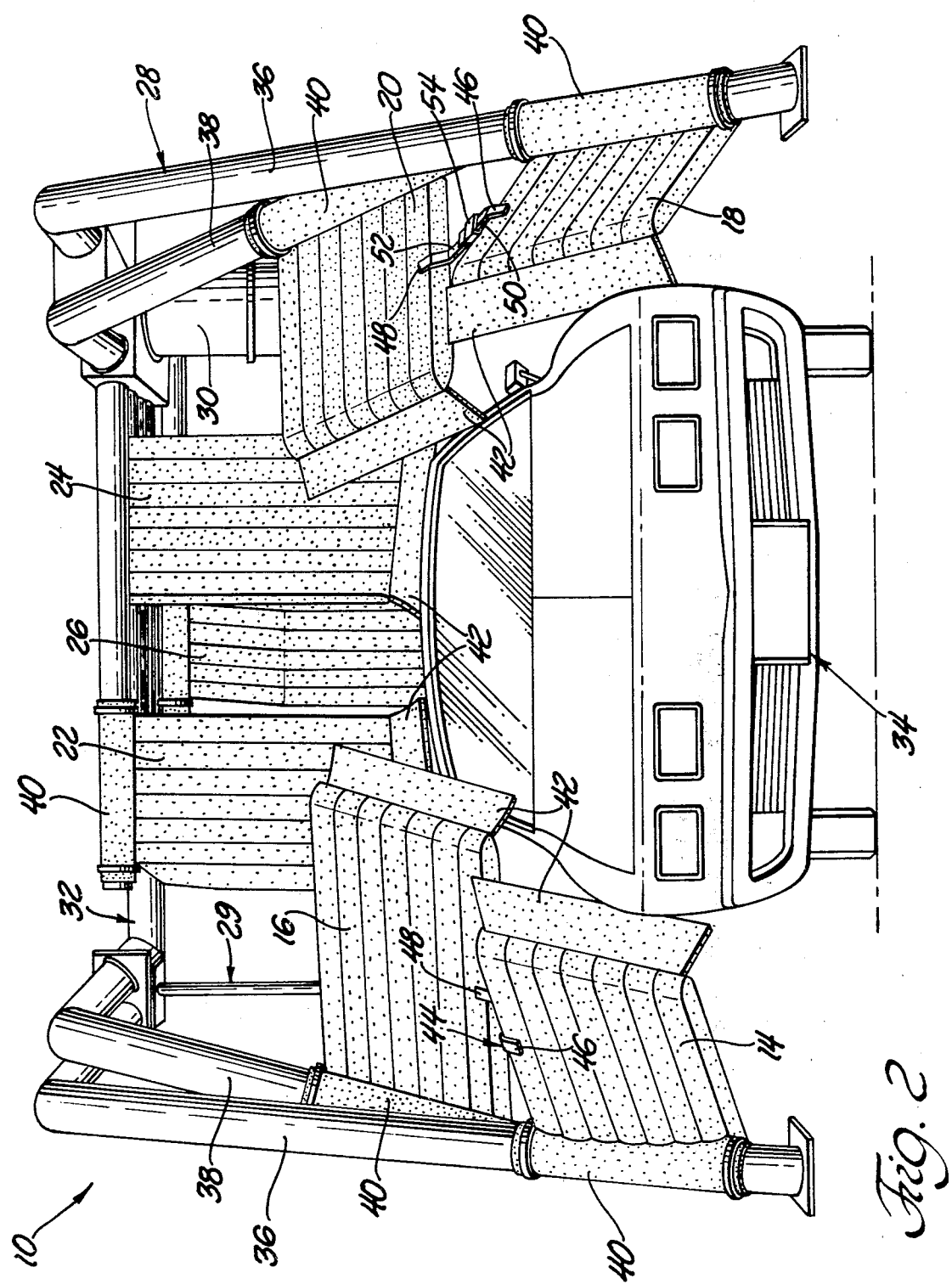

Due to the restriction at the outlet end of the bags provided by the nozzles 42, a bag pressure is created slightly greater than atmospheric pressure to keep the bags in an inflated condition. When the bags 14–26 are inflated, the air pressure within the bags 14–26 causes the bags 14–26 to be somewhat stiff or rigid. The bags 14–26, however, are sufficiently deformable under an applied force so that when the bags 14–26 are engaged by the vehicle 34 moving through the carwash, the bags are deflected or pushed aside. In this manner, the nozzles are caused to wipe the top and sides of the vehicle, as shown in FIG. 2.

The bags 14, 16, 18, 20 supported by the ducts 36, 38 are canted with respect to the vertical and horizontal, the second bags 16, 20 being canted towards the horizontal to a greater degree. The bags 14, 16, 18, 20 are mounted on the respective ducts 36, 38 so as to hinge about an axis defined by the ducts. Thusly, the upper second bags 16, 20 hinge about a more horizontal axis than the first bags 14, 16. Other means and mounting arrangements can be utilized to accomplish the same effect of canting the upper bags to a greater degree than the lower bags.

The instant invention is characterized by connector means, generally indicated at 44. The connector means 44 have one end portion 46 secured to a first of the laterally extending bags 14, 18 and a second end portion 48 secured to a second of the laterally extending bags 16, 20. In the embodiment shown in FIGS. 1 and 2, the connector means comprises a first strap 50 having one end 46 connected to a first of the laterally extending bags 14, 18 and a second strap 52 having one end 48 thereof secured to a second of the laterally extending bags 16-20. The connector means 44 further includes adjustment means, such as a buckle 54 adjustably connecting together the free ends of the first and second straps 50, 52 for adjusting the length of the connector means 44. Alternatively, the connector means may comprise a single strap having one end secured to a first of the laterally extending bags 14, 18 and a second end secured to a second of the laterally extending bags 16, 20.

In operation, as the vehicle 34 passes through the subject apparatus 10, the nozzles 42 of the vertically hanging bags 22, 24 and 26 engage the hood, roof and trunk of the passing vehicle. As the vehicle 34 further proceeds through the apparatus 10, the front portion of the vehicle initially engages the nozzles 42 of the first lower laterally extending bags 14, 18. Although the second bags 16, 20 are upstream in the path of the vehicle, they are also positioned above the nose of the vehicle so that the vehicle nose initially passes below the second bags 16, 20 and contacts the lower first bags 14, 18. The vehicle, by engaging the first lower bags 14, 18, deflects the flexible bags 14, 18 in relation to the side ducts 36. As the bags 14, 18 are deflected, the connector means 44, operatively connecting the bags 14, 18 to the bags 16, 20, respectively, properly positions the second bags 16, 20 in relation to the vehicle body such that the nozzles 42 of the second bags 16, 20 engage the windshield of the passing vehicle 34 but do not engage the hood thereof, as shown in FIG. 2. More specifically, as the first laterally extending bags 14, 16 are deflected by the vehicle 34, the bags 14, 18 pivot about a hinging axis thereof in relation to the side ducts 36. As the first bags 14, 18 pivot, the second bags 16, 20 are actuated to pivot along the ducts 38 by the connector means 44. The second bags 16, 20 pivot about a hinging axis parallel to the axis defined by the side ducts 38. Since the side ducts 38 are angled in relation to the vertical, the bags 16, 20 are deflected sidewards and upwards in relation to the passing vehicle 34 by the connector means 44. Thusly, the bags 16, 20 are moved upward and away from the hood portion of the vehicle 34 so that the nozzles 42 of the bags 16, 20 do not engage the hood of the vehicle 34 prior to engaging the windshield thereof. Thusly, the connector means 44 of the instant invention provide means for properly positioning the upper laterally extending second bags 16, 20 in relation to the vehicle body when the first bags 14, 18 are deflected by the engaging vehicle 34.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An apparatus (10) for stripping fluids from the surface of a vehicle, said apparatus (10) comprising: an air distributor (28); inflatable bags (14,–26), each of generally rectangular transverse cross section, said bags 14–26 supported by said air distributor (28) and each of said bags (14–26) including an inlet end (40) connected to said air distributor (28) for introducing air under pressure into said bags (14–26) and a nozzle end (42) of smaller area than said inlet end (40) spaced apart from said inlet end (40) for emitting a stream of air while maintaining said bags (14–26) in a nonflailing and inflated orientation, and characterized by connector means (44) having one end portion (46) secured to a first of said bags (14, 18) and a second end portion (48) secured to a second of said bags (16, 20) disposed above said first bag and spaced along said bags (14–20) from said air distributor (28) for connecting said first bag (14, 18) to said second bag (16, 20) for properly positioning said second bag (16, 20) in relation to a vehicle body when said first bag (14, 18) is deflected by the engaging vehicle (34).

2. An apparatus as set forth in claim 1 further characterized by said first and second bags (14, 16, 18, 20) being canted with respect to the vertical and horizontal.

3. An apparatus as set forth in claim 2 further characterized by said second bag (6, 20) being canted with respect to said first bag (14, 18).

4. An apparatus as set forth in claim 2 further characterized by said distributor (28) defining a path for a vehicle (34) passing through said apparatus (10), said second bag (16, 20) being supported by said air distributor (28) upstream in the path of the vehicle (34) in relation to said first bag (14, 18).

5. An apparatus as set forth in claim 4 further characterized by said connector means (44) including adjustment means (54) for adjusting the length of said connector means (44).

6. An apparatus as set forth in claim 5 further characterized by said connector means (44) comprising at least one strap having one end (46) secured to said first bag (14, 18) and a second end (48) secured to said second bag (16, 20), said strap including said adjustment means for adjusting the length of said strap.

7. An apparatus as set forth in claim 5 further characterized by said connector means (44) comprising a first strap (50) having one end (46) connected to said first bag (14, 18) and a second strap (52) having one end secured to said second bag (26, 20), said adjustment means adjustably connecting together the free ends of said first and second straps (50, 52).

8. A bag (14, 18) for use as an air distributor for stripping fluids from a passing vehicle (34), said bag (14, 18) being flexible and rigidly inflatable and of generally rectangular cross section, said bag (14, 18) having an inlet end (40) for introducing air under pressure into said bag (14, 18) and a nozzle end (42) spaced apart from said inlet end (40) for emitting a stream of air, and characterized by connector means (44) having one end portion (46) fastened to said bag (14, 18) between said inlet end (40) and said nozzle end (42) and a second end portion (48) adapted to be connected to a second bag (16, 20) for properly positioning one of the bags (16, 20) in relation to the vehicle body when the other bag (14, 18) is deflected by the engaging vehicle (34).

9. An apparatus as set forth in claim 8 further characterized by said connector means (44) including adjustment means (54) for adjusting the length of said connector means (44).

10. An apparatus as set forth in claim 9 further characterized by said connector means (44) comprising a first strap (50) having one end (46) connected to said first bag (14, 18) and a second strap (52) having one end secured to said second bag (26, 20), said adjustment means adjustably connecting together the free ends of said first and second straps (50, 52).

11. An apparatus (10) for stripping fluids from the surface of a vehicle (34) as the vehicle (34) is conveyed along a path through a carwash, said apparatus (10) comprising: an air distributor (28); a plurality of flexible inflatable bags (14–26), each of generally rectangular transverse cross section, said bags (14–26) being supported by said air distributor (28) in an array along the path of the vehicle (34) to strip fluid from the side surfaces of the vehicle (34) at least one of a first of said bags (14, 18) extending substantially laterally from said air distributor (28) and a second of said bags (16, 20) being disposed above said first bag (14, 18) and upstream in the path of the vehicle (34), and characterized by connector means (44) having one end portion (46) fastened to said first bag (14, 18) and a second end portion (48) fastened to said second bag (16, 20) and spaced along said bags (14–20) from said air distributor (28) for properly positioning said second bag (16, 20) in relation to the vehicle body when said first bag (14, 18) is deflected by the engaging vehicle (34).

* * * * *